US012588974B1

(12) United States Patent (10) Patent No.: US 12,588,974 B1

Shah (45) Date of Patent: Mar. 31, 2026

(54) ORTHODONTIC TOOL COMPRISING HOOK, CHEWY AND BRUSH MEMBERS

(71) Applicant: Kanchi Shah, Fogelsville, PA (US)

(72) Inventor: Kanchi Shah, Fogelsville, PA (US)

( * ) Notice: Subject to any disclaimer, the term of this patent is extended or adjusted under 35 U.S.C. 154(b) by 0 days.

(21) Appl. No.: 19/353,309

(22) Filed: Oct. 8, 2025

Related U.S. Application Data

(60) Provisional application No. 63/813,895, filed on May 29, 2025.

(51) Int. Cl.
 *A61C 7/02* (2006.01)

(52) U.S. Cl.
 CPC ...................................... *A61C 7/02* (2013.01)

(58) Field of Classification Search
 CPC .. A61C 7/02; A61C 7/08; A61C 7/146; A61C 3/00; A46B 5/002; A46B 2200/1066; A46B 2200/1073
 See application file for complete search history.

(56) References Cited

U.S. PATENT DOCUMENTS

| | | | | |
|---|---|---|---|---|
| D474,540 | S | 5/2003 | Mayer et al. | |
| 8,167,612 | B2 | 5/2012 | DeSanti | |
| D742,120 | S * | 11/2015 | Dalton | D4/108 |
| 9,351,808 | B2 * | 5/2016 | McCarthy | A61C 3/162 |
| D794,792 | S * | 8/2017 | Wolfe | D24/152 |
| D837,377 | S | 1/2019 | Steen | |
| D850,619 | S | 6/2019 | Saubers | |
| 10,307,223 | B1 * | 6/2019 | Aronson | A61C 7/023 |
| 10,675,125 | B1 * | 6/2020 | Ly | A61C 7/023 |
| D910,176 | S | 2/2021 | Scherr et al. | |
| 10,932,557 | B2 * | 3/2021 | To | A46B 15/0073 |
| 12,023,218 | B1 * | 7/2024 | Gentile | A61C 7/02 |
| 12,053,347 | B2 * | 8/2024 | Scherr | A61C 7/08 |
| D1,054,561 | S | 12/2024 | Steffe | |
| 2021/0186660 | A1 | 6/2021 | Dayan | |
| 2025/0009475 | A1 | 1/2025 | Yao et al. | |

FOREIGN PATENT DOCUMENTS

| | | |
|---|---|---|
| CN | 209187010 U | 8/2019 |
| CN | 211704895 U | 10/2020 |
| CN | 211704904 U | 10/2020 |
| CN | 219374984 U | 7/2023 |
| CN | 219461458 U | 8/2023 |
| CN | 220046119 U | 11/2023 |
| CN | 222486547 U | 2/2025 |
| TW | I739230 B | 9/2021 |

* cited by examiner

*Primary Examiner* — Ralph A Lewis

(74) *Attorney, Agent, or Firm* — Sidharth Kapoor; Pierson Ferdinand LLP

(57) ABSTRACT

Disclosed is an orthodontic tool configured to assist users in managing orthodontic appliances. The tool comprises a hook member for removing the orthodontic appliance from a dental arch, a chewy member for seating the orthodontic appliance onto the dental arch, and a brush member for cleaning internal surfaces of the orthodontic appliance. The brush member includes a plurality of bristles arranged to access crevices and recessed portions of the orthodontic appliance. The hook member, chewy member, and brush member are integrated into a single portable structure, which is compactly sized to be stored within a standard orthodontic appliance case. The orthodontic tool enhances patient convenience by combining multiple orthodontic appliance management functions into a single, easily transportable device.

15 Claims, 13 Drawing Sheets

ORTHODONTIC TOOL COMPRISING HOOK, CHEWY AND BRUSH MEMBERS

PRIORITY

Present application claims the benefit under 35 U.S.C. § 119 (e) of U.S. Provisional Patent Application No. 63/813,895, filed May 29, 2025, which is incorporated by reference herein in its entirety.

TECHNICAL FIELD

The present invention relates to orthodontic tools and accessories, and more particularly, to multifunctional tools for managing, manipulating, maintaining, and caring for orthodontic appliances and associated dental treatment components. The tool comprises integrated components including but not limited to a hook member for engaging and removing orthodontic appliances, a chewy member for positioning and seating orthodontic appliances, and a brush member for cleaning and maintaining orthodontic appliances, all consolidated into a single portable structure suitable for comprehensive orthodontic appliance management.

BACKGROUND

Orthodontic patients utilizing various orthodontic appliances including but not limited to clear aligners, traditional and lingual retainers, bite guards, night guards, splints, palatal expanders, space maintainers, functional appliances, elastic bands, ligatures, archwires, and any removable or semi-removable dental appliances, often require auxiliary tools to assist with appliance engagement, disengagement, positioning, adjustment, seating, maintenance, and hygiene management. Traditionally, these functions are addressed through separate devices: hooks for removal, chewies for seating, and brushes for cleaning. This multiplicity can lead to inconvenience, especially when portability and ease of use are paramount.

Existing solutions provided by conventional products, while address individual aspects of orthodontic appliance management, fall short of providing a comprehensive, all-in-one tool that encompasses removal, seating, and cleaning functionalities. The absence of such an integrated device necessitates the use of multiple tools, which can be cumbersome and inconvenient for users, particularly when traveling or managing orthodontic appliance care on the go.

Therefore, there exists a need for a compact, multifunctional orthodontic tool that consolidates the essential tasks of orthodontic appliance removal, seating, and cleaning into a single, portable device, thereby enhancing user convenience and compliance with orthodontic appliance care protocols.

SUMMARY

The present disclosure provides an orthodontic tool configured to assist users in managing orthodontic appliances. The tool comprises a hook member for removing an orthodontic appliance from a dental arch such as an aligner or a retainer, a chewy member for seating the orthodontic appliance securely onto the arch which can also assist in proper tracking of tooth movement and treatment efficiency, and a brush member for cleaning internal surfaces of the orthodontic appliance as well as a portable brush to clean their own teeth on the go. The brush member includes a plurality of bristles arranged to access crevices and recessed portions of the orthodontic appliance. All three components are integrated into a single compact structure designed to fit within a standard orthodontic appliance case. This integrated configuration enhances portability and convenience for orthodontic appliance users. This configuration provides a comprehensive, space-efficient, and user-friendly solution for managing orthodontic appliances, offering users an integrated tool that supports removal, seating, and cleaning within a single, easily portable form.

In one implementation form, the hook member includes a tapered tip that enables precise engagement with a marginal edge of the orthodontic appliance. The tapering facilitates controlled removal without requiring excessive force, reducing user discomfort and enhancing ease of use.

In another implementation form, the tapered tip of the hook member is fabricated from a softer material compared to the rest of the hook body. This material difference is intended to minimize the risk of damaging tooth enamel during repeated use, thereby improving patient safety. Alternatively, in another embodiment, the tapered tip of the hook member may be fabricated from the same material as the rest of the hook body.

In a further implementation form, the hook member is removably mounted to the orthodontic tool, enabling replacement when worn or damaged. This extends the lifespan of the tool and improves cost efficiency for users.

In yet another implementation form, the chewy member is pivotally connected to the orthodontic tool. The pivotal attachment allows the chewy to be moved into a usable position and stowed away compactly when not in use, thereby supporting both functionality and compactness.

In another implementation form, the orthodontic tool comprises an opening configured to pivotally receive the chewy member. The dedicated pivot opening provides mechanical stability during use while maintaining a compact footprint when stowed.

In a further implementation form, the chewy member comprises a pivot portion, a first cylindrical portion with a first diameter, and a second cylindrical portion with a larger diameter. This geometric profile allows for controlled flex and comfortable engagement between the user's teeth and the chewy, improving orthodontic appliance seating effectiveness.

In yet another implementation form, a locking mechanism is provided to retain the chewy member in a fixed position during use. This prevents unintended movement or rotation of the chewy while it is being bitten, thereby improving stability and user confidence.

In another implementation form, the brush member comprises a pyramidal brush profile tapering toward the middle. This profile allows the bristles to reach into narrow crevices and angled corners of the orthodontic appliance as well as teeth, interdental and gums area, thereby enabling more effective cleaning. The brush member may be detachable and replaceable based on the use and wear and tear.

In a further implementation form, the pyramidal brush profile comprises three sections: a first section with bristles slanting downward toward one side, a middle section with bristles that split directionally toward both sides, and a third section with bristles slanting downward toward the opposite side. This varying bristle orientation ensures comprehensive surface coverage during brushing, improving hygiene and reducing bacterial buildup on the orthodontic appliance.

It is to be appreciated that all the aforementioned implementation forms can be combined. All steps which are performed by the various entities described in the present disclosure as well as the functionalities described to be performed by the various entities are intended to mean that the respective entity is adapted to or configured to perform the respective steps and functionalities. It will be appreciated that features of the present disclosure are susceptible to being combined in various combinations without departing from the scope of the present disclosure as defined by the appended claims. Additional aspects, advantages, features, and objects of the present disclosure would be made apparent from the drawings and the detailed description of the illustrative implementations construed in conjunction with the appended claims that follow.

BRIEF DESCRIPTION OF DRAWINGS

Notwithstanding any other forms which may fall within the scope of the present invention, preferred embodiments of the disclosure will now be described, by way of example only, with reference to the accompanying drawings in which.

DETAILED DESCRIPTION

The example embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Several existing devices attempt to combine multiple functionalities to enhance user convenience. For instance, Chinese Utility Model CN211704904U discloses an orthodontic tool integrating a hook and a brush. While this design aids in both removal and cleaning, it lacks a component to assist in seating the orthodontic appliance, such as a chewy, thereby necessitating an additional tool for comprehensive orthodontic appliance management.

Similarly, CN211704895U presents a tool combining a hook and a chewy. This configuration facilitates orthodontic appliance removal and seating but omits a cleaning mechanism, requiring users to carry a separate brush for hygiene purposes.

Taiwanese Patent TWI739230B introduces an orthodontic device focusing primarily on cleaning, featuring a specialized brush design. However, it does not incorporate elements for orthodontic appliance removal or seating, limiting its utility to hygiene maintenance alone.

U.S. Pat. No. 8,167,612B2 describes a multifunctional oral hygiene tool that includes a brush and a flossing mechanism. Although it offers combined functionalities, it is tailored more towards general oral hygiene rather than the specific needs associated with clear orthodontic appliance usage, such as orthodontic aligners removal and seating assistance.

In view of the foregoing limitations in the prior art, there exists a need for an orthodontic tool that specifically addresses the comprehensive care requirements of orthodontic appliances through integrated functionality. The present invention fulfills this need by providing a multifunctional orthodontic tool that combines appliance removal, seating, and cleaning capabilities in a single portable device designed for optimal patient compliance and convenience. The invention will now be described in detail with reference to the accompanying figures.

Figure 1:
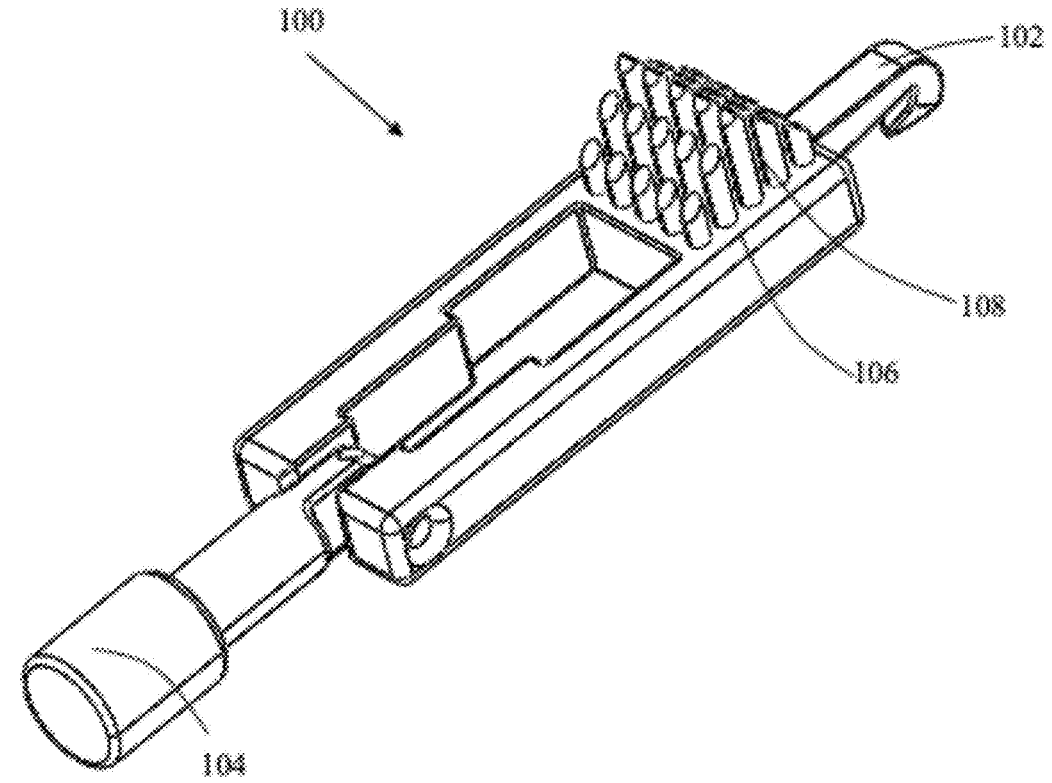
FIG. 1 shows a front perspective view of an orthodontic tool, in accordance with an embodiment of the present disclosure.

Referring to FIG. 1, there is shown a front perspective view of an orthodontic tool 100, in accordance with an embodiment of the present disclosure. The orthodontic tool 100 is designed to assist users in managing orthodontic appliances by consolidating multiple functions such as removal, seating and cleaning of the orthodontic appliance into a single compact and portable device. The orthodontic tool 100 is particularly suited for patients undergoing clear orthodontic appliance therapy and aims to address challenges associated with carrying multiple individual tools, ensuring that orthodontic appliance management remains efficient, hygienic and user-friendly.

As shown in FIG. 1, the orthodontic tool 100 comprises a hook member 102, a brush member 106 with a plurality of bristles 108, and a chewy member 104. Each of these components are discussed in further detail below. As represented in FIG. 1, the hook member 102 extends in a first direction and the chewy member 104 extends in an opposite direction away from the hook member 102 while the brush member 106 is affixed to a top surface of the orthodontic tool 100 that is more proximate to the hook member 102 than it is to the chewy member 104 in its deployed configuration. Further, as shown in FIG. 1, a top surface orthodontic tool 100 comprises a cavity or opening 500 (shown in FIG. 5) therein that is configured and shaped to receive only the chewy member 104 while not receiving the brush member 106 and the hook member 102 therein. As shown in FIG. 1, the hook member 102 extends outward and away from body of the orthodontic tool 100. Such that the hook member 102 and the brush member 106 are not received in the opening 500.

Furthermore, the cavity or opening 500 in the body of the orthodontic tool 100 is configured such that it forms an opening that extends from the top surface through the bottom surface of the orthodontic tool 100. In other words, the cavity extends through the entire width of the orthodontic tool 100 as evidenced from FIG. 1. Moreover, the opening 500 is shaped to include a wider region and a narrower region that are to mirror and receive the first cylindrical portion 504 and second cylindrical portion 506 of the chewy member 104. As the chewy member 104 pivots into and gets stowed away into the opening 500, the opening is shaped as such that the first cylindrical portion 504 is received a narrow region of the opening 500 and the second cylindrical portion 506 is received in the wider region of the opening 500.

The orthodontic tool 100 comprises a hook member 102 configured to assist in removal of an orthodontic appliance from a dental arch of a user. The term "hook member" as used herein refers to a protruding structural element shaped to engage a marginal edge of the orthodontic appliance and lift or disengage it from contact with the teeth or gumline. The hook member 102 enables the user to safely and hygienically remove the orthodontic appliance without having to insert fingers into the oral cavity, thereby reducing the risk of contamination or injury. Optionally, the hook member 102 may also be used to assist in engaging or removing orthodontic elastic bands during treatment. This additional utility enables the hook member 102 to serve as a multipurpose aid for various orthodontic appliance-related and orthodontic interventions.

The hook member 102 comprises a tapered tip 200 configured to engage various portions of the orthodontic appliance including but not limited to marginal edges, attachment points, undercuts, flanges, clasps, or any accessible surface or feature of the appliance. The hook member 102 may be configured with multiple engagement surfaces, varying tip geometries, or interchangeable tip configurations to accommodate different appliance types and engagement requirements. The hook member 102 may further include secondary features such as leverage points, grip enhancements, or auxiliary engagement elements to facilitate appliance manipulation under various clinical and user scenarios.

The orthodontic tool 100 further comprises a chewy member 104 configured to facilitate seating of the orthodontic appliance onto the dental arch of the user. The term "chewy member" as used herein refers to a compressible element that can be bitten down on by the user to exert uniform pressure on the orthodontic appliance, thereby improving its fit and ensuring proper tracking of tooth movement. The chewy member 104 is mechanically integrated with the orthodontic tool 100 and is positioned to allow convenient use while maintaining the compactness of the tool.

The chewy member 104 may comprise various geometric configurations including but not limited to cylindrical portions of varying diameters, conical sections, spherical elements, textured surfaces, grooved patterns, or any combination thereof. The chewy member 104 may feature stepped profiles, tapered configurations, bulbous sections, or variable compliance zones to optimize pressure distribution and user comfort. The chewy member 104 may incorporate multiple biting surfaces, directional guides, or positioning features to accommodate different jaw configurations and treatment requirements.

Additionally, the orthodontic tool 100 comprises a brush member 106 configured to clean internal surfaces of the orthodontic appliance. The term "brush member" as used herein relates to a set of bristles mounted to the orthodontic tool 100, where the bristles are adapted to reach and clean fine crevices and recessed portions of the orthodontic appliance tray as well as teeth/gums. The brush member 106 comprises a plurality of bristles 108 that may be arranged in a structured profile to facilitate cleaning of orthodontic appliance surfaces that are in contact with teeth, as well as interproximal and marginal areas where food debris and plaque tend to accumulate.

In another embodiment, the brush member 106 may comprise various bristle arrangements including but not limited to pyramidal profiles, cylindrical configurations, conical shapes, flat profiles, curved geometries, or any combination thereof. The bristles may be arranged in multiple sections with varying orientations, densities, lengths, stiffness, or materials to optimize cleaning effectiveness for different appliance geometries and surface textures. The brush member 106 may include bristles of different materials, colors, or properties within the same brush assembly, and may incorporate additional cleaning elements such as flossing components, scraping edges, or massage elements.

The hook member 102, chewy member 104, and brush member 106 are integrated into a single portable structure sized to be stored within a standard orthodontic appliance case (not shown). The term "portable structure" as used herein refers to a physically unified body in which all three functional components coexist, thereby reducing the need for users to carry separate tools for each task. This configuration promotes convenience, travel-readiness, and increased adherence to daily orthodontic appliance maintenance routines.

Alternative embodiments of the orthodontic tool 100 may incorporate modular configurations wherein the hook member 102, brush member 106, or chewy member 104 can be selectively reconfigured or interchanged to accommodate specific user preferences or treatment requirements. The orthodontic tool 100 may be available in multiple sizes including compact versions for travel use, standard versions for daily home use, or extended versions with enhanced functional capabilities. Color-coded variants of the orthodontic tool 100 may be provided to enable identification of individual tools within households, orthodontic practices, or institutional settings. The orthodontic tool 100 may incorporate antimicrobial treatments, UV-resistant materials, or specialized coatings that enhance hygiene maintenance and extend product lifespan under various environmental conditions. Specialized versions of the orthodontic tool 100 may be configured for specific orthodontic appliance types including clear aligners, traditional retainers, palatal expanders, or other removable orthodontic devices, with component geometries optimized for each application.

The hook member 102, chewy member 104, and brush member 106, along with any additional functional components, are integrated into a single portable structure that may be configured for storage within various containers including but not limited to standard orthodontic appliance cases, travel containers, pouches, holders, or any suitable carrying device. The integration may be achieved through various means including permanent attachment, removable coupling, modular assembly, or any combination thereof. The portable structure may include additional features such as protective covers, lanyards, identification labels, or organizational elements to enhance user convenience and appliance management.

In one implementation scenario, a user undergoing orthodontic treatment may carry the orthodontic tool 100 inside their orthodontic appliance case while traveling. Upon reaching a destination, the user may use the hook member 102 to safely remove the orthodontic appliances before meals, utilize the brush member 106 to clean the orthodontic appliances under running water, and then use the chewy member 104 after reinsertion to ensure the orthodontic appliances are seated properly. This self-contained, multifunctional tool eliminates the need for multiple accessories and supports better hygiene and compliance, especially for users frequently on the move.

The present invention has undergone extensive clinical testing involving multiple patient samples to validate design effectiveness and optimize user experience parameters. Initial testing protocols utilizing fifteen patient samples identified specific performance limitations in conventional hook designs, particularly relating to engagement difficulties in patients experiencing gingival swelling or tissue inflammation during orthodontic treatment. This empirical feedback informed iterative design modifications including hook tip geometry refinements from flat square configurations to pointed configurations with lateral projections, and material property adjustments based on patient comfort preferences for the chewy member 104. The testing methodology incorporated assessment of hook engagement success rates across varying patient anatomical conditions, material durability performance under repeated use scenarios, and user preference metrics that directly influenced design optimization decisions. Ongoing clinical evaluation with expanded patient sample sizes continues to inform design refinements and manufacturing process improvements to ensure optimal product performance across diverse patient populations and treatment conditions.

Figure 2:
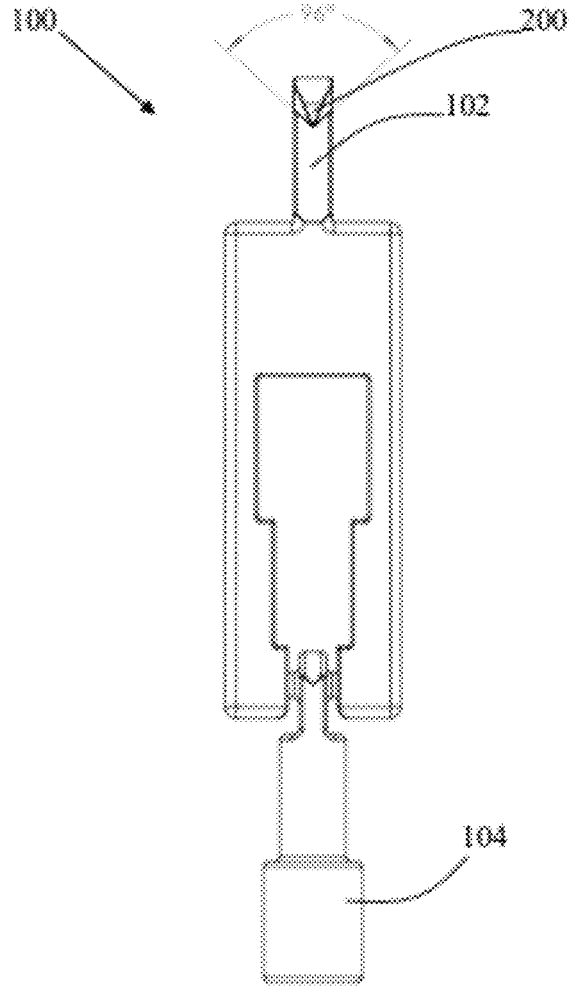
FIG. 2 shows a bottom view of the orthodontic tool of FIG. 1, in accordance with an embodiment of the present disclosure.

Referring now to FIG. 2, there is shown a side view of the orthodontic tool 100 shown in FIG. 1, in accordance with an embodiment of the present disclosure. As shown, the hook member 102 comprises a tapered tip 200 configured to engage a marginal edge of the orthodontic appliance. The term "tapered tip" as used herein relates to a pointed or narrowing end portion of the hook member 102 that facilitates insertion between the orthodontic appliance and the tooth surface with minimal resistance. The tapered geometry allows the user to apply a controlled lifting force to detach the orthodontic appliance from the dental arch.

The tapered tip 200 is associated with a taper angle within a range of 60 to 120 degrees. This taper range is selected to balance structural strength with effective engagement geometry, ensuring that the tip does not deform during use while also minimizing pressure applied to the orthodontic appliance edge. For example, as shown, the tapered tip 200 is associated with a taper angle of 96 degrees. This specific angle allows for optimal penetration and leverage when disengaging the orthodontic appliance, making it easier for the user to initiate removal without causing discomfort or damaging the orthodontic appliance material.

The hook member 102 provides additional utility beyond orthodontic appliance removal by serving as an engagement tool for orthodontic elastic bands or rubber bands that are commonly prescribed during orthodontic treatment protocols. The tapered tip 200 of the hook member 102 is particularly advantageous for engaging clastic bands onto attachment points located on posterior teeth where direct finger access may be challenging or impractical. This functionality is especially beneficial for patients who maintain longer fingernails, as the hook member 102 eliminates the need for direct finger contact with the elastic bands while providing precise control during placement procedures. The hook member 102 enables users to stretch elastic bands and position them accurately onto orthodontic hooks, brackets, or other attachment points in the posterior oral cavity regions that are difficult to reach through conventional manual placement techniques. The rigid construction of the hook member 102 provides the necessary leverage and control for elastic band manipulation, while the smooth surface finish of the tapered tip 200 prevents damage to the clastic material during engagement procedures. This dual functionality enhances the overall utility of the orthodontic tool 100 by consolidating appliance removal and elastic band placement capabilities within a single integrated device, thereby reducing the number of auxiliary tools required for comprehensive orthodontic care management.

In certain embodiments, the hook member 102 may be configured with enhanced tip geometries to accommodate varying patient conditions and improve engagement effectiveness. The tapered tip 200 may range from substantially flat square cross-sectional configurations to completely pointed geometries, with the pointed configurations providing superior engagement capabilities particularly in challenging anatomical conditions. The pointed hook design may incorporate lateral projections or beak-like extensions that extend outwardly from opposite sides of the body 300 of the hook member 102, creating multiple engagement surfaces that allow patients to locate optimal contact points even when experiencing gingival inflammation or tissue swelling. The lateral projections may be oriented at increased angles relative to the hook shaft axis compared to conventional flat-tip designs, providing enhanced mechanical advantage and improved accessibility to appliance edges positioned in recessed or swollen tissue areas. This multicontact point configuration ensures reliable appliance engagement across a broader range of patient anatomical variations and treatment conditions.

Figure 3:
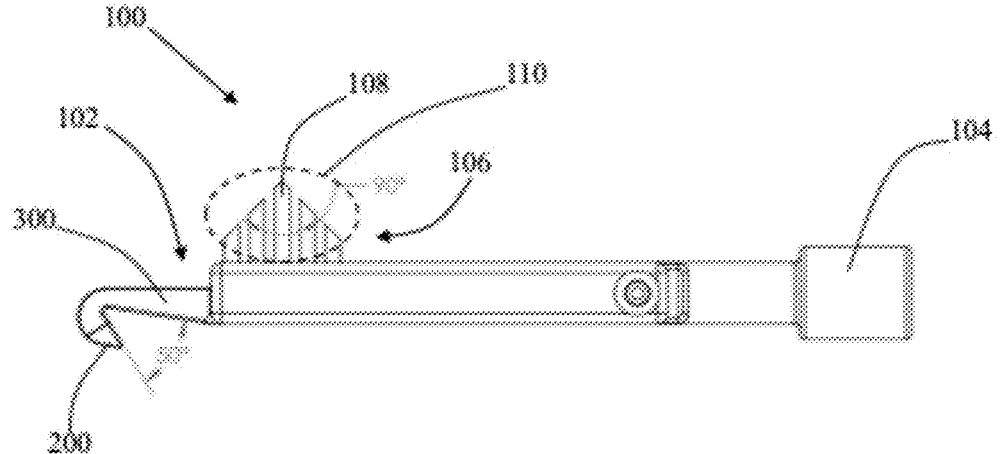
FIG. 3 shows a side view of the orthodontic tool of FIGS. 1-2, in accordance with an embodiment of the present disclosure.

Referring now to FIG. 3, there is shown a side view of the orthodontic tool 100 of FIGS. 1-2, in accordance with an embodiment of the present disclosure. The tapered tip 200 is disposed at an angle within a range of 30 to 80 degrees with respect to a body 300 of the hook member 102. The angular disposition of the tapered tip 200 relative to the body 300 enables ergonomic positioning and directional control during insertion and removal of the orthodontic appliance. This configuration allows the user to apply a lifting or prying force in a natural motion aligned with the curvature of the dental arch.

In one implementation form, the tapered tip 200 of the hook member 102 is fabricated from a softer material relative to the body 300 of the hook member 102. The term "softer material" as used herein refers to a material having a lower hardness or modulus of elasticity compared to the main structural material of the hook body, to reduce the risk of damaging enamel or deforming the orthodontic appliance during removal. Alternatively, in another embodiment, the tapered tip 200 of the hook member 102 may be fabricated from the same material as the rest of the hook body. The chewy member 104 is for increased comfort and better seating of the aligner.

By way of example, the body 300 of the hook member 102 may be fabricated from rigid, durable materials such as acrylonitrile butadiene styrene (ABS), polycarbonate (PC), or stainless steel to ensure structural integrity and resistance to repetitive stress. The tapered tip 200, in contrast, may be fabricated from elastomeric or soft polymeric materials such as thermoplastic elastomer (TPE), silicone rubber, or polyurethane to provide gentle contact with the orthodontic appliance and tooth surfaces. This material differentiation enables a combination of strength and compliance, enhancing user comfort and safety during use.

In another embodiment, the body of the hook member 102 may be fabricated from various rigid, semi-rigid, or flexible materials including but not limited to acrylonitrile butadiene styrene (ABS), polycarbonate (PC), polyethylene, polypropylene, nylon, PEEK, stainless steel, titanium, aluminum alloys, carbon fiber composites, ceramic materials, or any biocompatible engineering materials suitable for oral applications. The tapered tip 200 may be fabricated from compliant materials including but not limited to thermoplastic elastomers (TPE), silicone rubber, polyurethane, soft vinyl, medical-grade polymers, or any biocompatible material having appropriate flexibility and surface properties for safe oral contact.

Safety considerations for the orthodontic tool 100 include biocompatibility testing of all materials that contact oral tissues, ensuring compliance with FDA regulations for medical devices, and validation of component strength under expected use conditions. The tapered tip 200 of the hook member 102 may incorporate safety features such as rounded edges, maximum penetration depth limiters, or force-limiting mechanisms to prevent inadvertent tissue damage during appliance removal procedures. The bristles 108 of the brush member 106 may be manufactured from materials that resist bacterial growth, maintain structural integrity under repeated flexing, and provide appropriate stiffness for effective cleaning without causing appliance surface damage. The chewy member 104 materials may be selected to resist degradation under repeated compression cycles, maintain consistent hardness properties throughout the product lifespan, and provide appropriate tactile feedback to ensure proper appliance seating without excessive bite forces.

In another implementation form, the hook member 102 is removably mounted to the orthodontic tool 100. The term "removably mounted" as used herein refers to a mechanical coupling that allows the hook member 102 to be detached from and reattached to the orthodontic tool 100 without damaging either component. This configuration facilitates replacement of the hook member 102 in case of wear, contamination, or user preference for alternative hook geometries.

The removable mounting may be achieved using one or more coupling mechanisms such as a snap-fit connector, threaded interface, or a slotted engagement with retention tabs. This allows the user to securely attach the hook member 102 during use while also enabling convenient disassembly for cleaning or replacement. The ability to replace the hook member 102 without discarding the entire orthodontic tool 100 contributes to product longevity, cost efficiency, and customization for varied user needs.

The orthodontic tool 100 employs a modular architecture comprising discrete replaceable assemblies designed for efficient maintenance and component renewal. The tool structure includes two primary replaceable units: a hook-brush assembly that integrates the hook member 102, brush member 106, bristles 108, and associated housing structure as a unified replaceable component, and a chewy member assembly 114 that functions as an independent replaceable unit. This configuration enables users to replace worn or damaged components without requiring individual part replacement, simplifying maintenance procedures and ensuring consistent tool performance. The hook-brush assembly cannot be separated into individual hook and bristle components for replacement, but rather must be replaced as an integrated unit to maintain proper mechanical alignment and operational effectiveness. The modular connection system between assemblies accommodates complete unit replacement through user-friendly mechanisms that do not require specialized tools or technical expertise.

Figure 4:
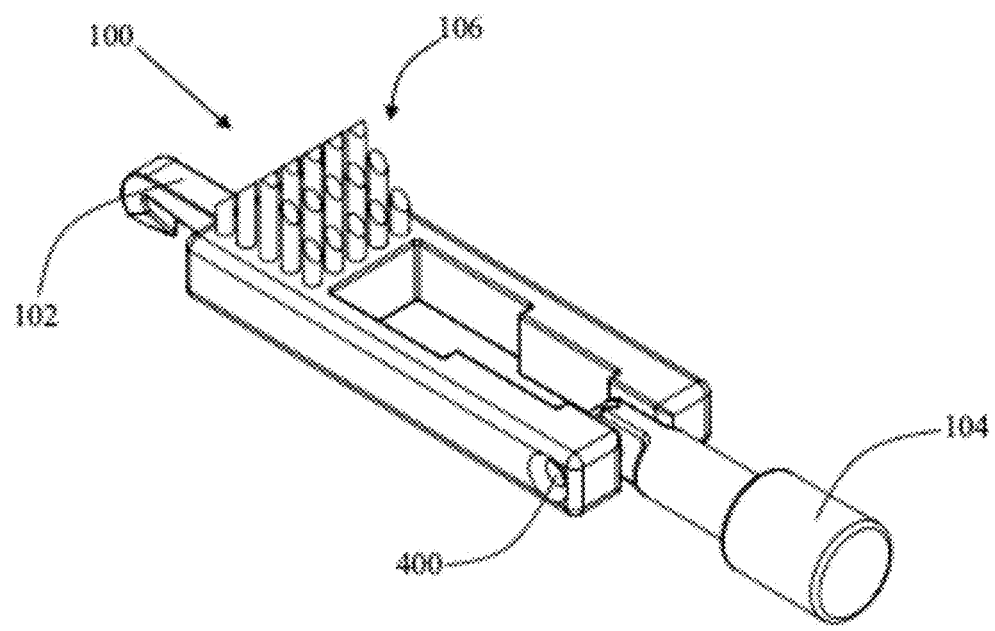
FIG. 4 shows a rear perspective view of the orthodontic tool of FIGS. 1-3, in accordance with an embodiment of the present disclosure.

Referring now to FIG. 4, there is shown a rear perspective view of the orthodontic tool 100 shown in FIGS. 1-3, in accordance with an embodiment of the present disclosure. As shown, the chewy member 104 is pivotally connected to the orthodontic tool 100. The pivotal connection allows the chewy member 104 to be rotated between a stowed position and an active position for use, thereby preserving the compactness of the tool while still enabling functional engagement when required.

The pivotal connection is facilitated by a pivot mechanism 400 disposed between the chewy member 104 and the body of the orthodontic tool 100. The term "pivot mechanism" as used herein refers to a mechanical joint that enables angular displacement of the chewy member 104 about a pivot axis. In one example, the pivot mechanism 400 may comprise an axle or pin seated within an opening formed in the orthodontic tool 100, wherein the chewy member 104 includes a complementary pivot recess or bore that receives the axle.

The pivot mechanism 400 is configured to provide sufficient rotational freedom to allow deployment of the chewy member 104 at an ergonomic angle for biting, while also offering enough friction or detent-based resistance to maintain the chewy member 104 in a stable position during use. In some implementations, the pivot mechanism 400 may further include internal ridges, stops, or interference fits to define discrete rotational positions for improved user control and mechanical stability. This arrangement supports both ease of operation and portability, allowing the chewy member 104 to be securely folded away after use.

The pivot mechanism 400 may be configured with enhanced retention features to accommodate the improved chewy member 104 design based on clinical testing feedback. The pivot mechanism 400 may include detent positions that provide discrete angular positioning for the chewy member 104, ensuring stable deployment angles during use. The opening 500 may incorporate retention grooves or friction surfaces that interact with the pivot portion 502 to maintain the desired positioning of the chewy member 104 during bite forces applied to the first cylindrical portion 504 and second cylindrical portion 506. The pivot mechanism 400 design ensures that the chewy member 104 remains securely positioned throughout the seating process while still allowing convenient stowage when not in use.

In accordance with an example embodiment, the orthodontic tool 100 is configured as a unitary manufactured component that permanently integrates the hook member 102, brush member 106, and opening 500 within a single body structure. This integrated design ensures that the hook member 102 and brush member 106 cannot be individually separated or replaced from the orthodontic tool 100, thereby maintaining consistent mechanical alignment, operational effectiveness, and structural integrity throughout the product lifecycle. The opening 500 is formed directly within the body of the orthodontic tool 100 during the manufacturing process, creating a permanent receptacle specifically dimensioned to accommodate the chewy member 104.

Only the chewy member 104 is designed as a replaceable component that can be selectively removed from a pivot portion 502 of the opening 500 without affecting the structural integrity of the orthodontic tool 100. This single-component replaceability architecture provides users with the ability to refresh the chewy functionality when wear or hygiene considerations dictate replacement, while preserving the investment in the primary orthodontic tool 100 structure. The permanent integration of the hook member 102 and brush member 106 within the orthodontic tool 100 eliminates potential failure points that could result from separable connections, ensures consistent performance characteristics over extended use periods, and maintains the compact form factor essential for storage within standard orthodontic appliance cases. This design approach contrasts with multi-component systems that require individual replacement of multiple elements, instead providing a simplified maintenance protocol focused solely on chewy member 104 replacement as needed.

Figure 5:
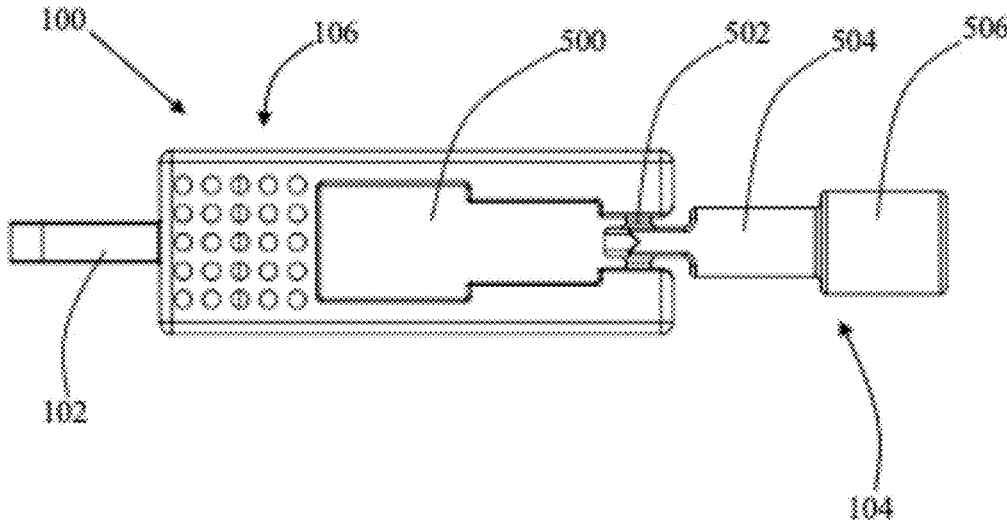
FIG. 5 shows a top view of the orthodontic tool of FIGS. 1-4, in accordance with an embodiment of the present disclosure.

Referring now to FIG. 5, there is shown a top view of the orthodontic tool 100 of FIGS. 1-4, in accordance with an embodiment of the present disclosure. As shown, the orthodontic tool 100 comprises an opening 500 configured to pivotally receive the chewy member 104. The term "opening" as used herein refers to a recessed or through-hole feature formed in the body of the orthodontic tool 100, dimensioned to accept and support the rotational movement of the chewy member 104 about a defined pivot axis.

In one implementation form, the chewy member 104 comprises a pivot portion 502 configured to engage the opening 500. The term "pivot portion" as used herein relates to a protruding element such as a shaft, pin, or stub formed integrally with or affixed to the chewy member 104, allowing the chewy member to rotate relative to the orthodontic tool 100 when seated within the opening 500.

The chewy member 104 further comprises a first cylindrical portion 504 disposed adjacent to the pivot portion 502 and having a first diameter, and a second cylindrical portion 506 disposed adjacent to the first cylindrical portion 504 and having a second diameter greater than the first diameter. This stepped cylindrical profile provides a functional gripping surface for the user to bite down on, with the difference in diameter aiding in distributing bite force and improving comfort during use. The smaller first cylindrical portion 504 may serve as a transitional section, while the larger second cylindrical portion 506 increases surface area for effective pressure application across the orthodontic appliance surface, facilitating proper seating of the orthodontic appliance onto the dental arch. Notably, the first cylindrical portion 504 and the second cylindrical portion 506 may be fabricated from either the same or different materials, depending on the desired balance of flexibility, durability, and pressure distribution characteristics required for optimal appliance engagement.

The chewy member 104 may be fabricated from various elastomeric materials selected based on patient comfort requirements and manufacturing considerations. In production embodiments, the chewy member 104 may preferably constructed from thermoplastic polyurethane (TPU) which provides optimal durability and patient comfort characteristics. However, prototype and alternative embodiments may utilize medical-grade silicone materials with hardness ratings ranging from Shore A 70 to Shore A 95, with Shore A 90 silicone representing a particularly suitable configuration based on clinical testing feedback. Patient preference studies have indicated optimal comfort when the chewy member 104 maintains uniform material properties throughout its structure, eliminating hardness differentials between the second cylindrical portion 506 and the first cylindrical portion 504 that may create uncomfortable pressure points during use. The material selection process incorporates empirical feedback regarding tactile comfort, bite resistance, and long-term durability under repeated compression cycles typical of orthodontic appliance seating procedures.

In accordance with the present invention's material optimization, the chewy member 104 has been designed with uniform material properties throughout its entire structure, including both the first cylindrical portion 504 and the second cylindrical portion 506. This design decision eliminates the complexity of dual-material construction while ensuring consistent user experience and manufacturing efficiency. In prototype embodiments, the chewy member 104 is fabricated from medical-grade silicone with Shore A 90 hardness, which provides optimal bite resistance and patient comfort based on clinical testing feedback. For production embodiments, the chewy member 104 will be manufactured from thermoplastic polyurethane (TPU), which offers superior durability, biocompatibility, and long-term performance characteristics compared to prototype materials. The body of the orthodontic tool 100, including the hook member 102, brush member 106, and the structural housing containing the opening 500, is fabricated from polylactic acid (PLA) material, which provides the necessary rigidity and structural integrity for the integrated tool architecture. This material combination ensures that the orthodontic tool 100 maintains its compact form factor while providing the appropriate balance of flexibility in the chewy member 104 and rigidity in the structural components, thereby optimizing both functionality and manufacturing cost-effectiveness.

Figure 6:
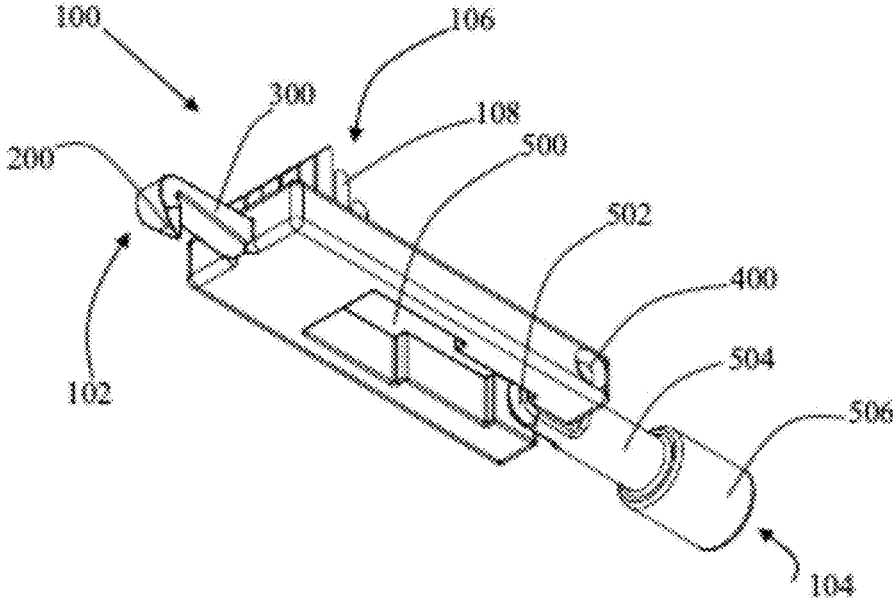
FIG. 6 shows another angle perspective view of the orthodontic tool of FIGS. 1-5, in accordance with an embodiment of the present disclosure.

Referring now to FIG. 6, there is shown a top perspective view of the orthodontic tool 100 of FIGS. 1-5, in accordance with an embodiment of the present disclosure. In one implementation form, the orthodontic tool 100 further comprises a locking mechanism (not shown) configured to retain the chewy member 104 in a fixed position during use. The term "locking mechanism" as used herein refers to a structural or mechanical feature designed to restrict rotational movement of the chewy member 104 once it is deployed into an active position. This may include, for example, a detent system, friction fit, snap-fit feature, or a spring-loaded catch that engages the chewy member 104 at a predefined angular position.

The locking mechanism may comprise various retention systems including but not limited to detent mechanisms, friction fits, snap-fit features, spring-loaded catches, magnetic retention, mechanical latches, interference fits, threaded connections, cam locks, or any combination thereof. The locking mechanism may provide multiple discrete positions, continuous adjustment, or variable retention force depending on user requirements and intended application scenarios.

The locking mechanism is positioned to interact with either the pivot portion 502 of the chewy member 104 or the opening 500 of the orthodontic tool 100. During operation, when the chewy member 104 is rotated into a functional orientation, the locking mechanism ensures that it remains stable and does not unintentionally pivot or collapse due to applied bite forces. This improves safety and comfort for the user by preventing misalignment or shifting during orthodontic appliance seating operations. After use, the user may release or overcome the locking mechanism to return the chewy member 104 to its stowed position. Optionally, the stepped cylindrical profile of the chewy member 104 retains the chewy member 104 in a locked position within the opening 500 when the orthodontic tool 100 is not in use, such as during storage thereof within the standard orthodontic appliance case. Referring back to FIG. 3, as shown, the brush member 106 comprises a pyramidal brush profile 110 tapering toward a middle of the brush member 106. The term "pyramidal brush profile" as used herein refers to a bristle arrangement in which opposing rows of bristles are slanted inwardly toward a central apex, forming a geometric taper similar to a pyramid when viewed in cross-section. This pyramidal brush profile 110 enhances the ability of the brush member 106 to reach into recessed or contoured areas of the orthodontic appliance, including interproximal spaces and undercuts.

The pyramidal brush profile 110 is associated with an angle in a range of 45 to 120 degrees. The selected angle defines the convergence slope of the bristles and directly affects cleaning precision and surface contact. In an example, as shown, the pyramidal brush profile 110 is associated with an angle of 90 degrees. This configuration creates a symmetrical taper that balances bristle flexibility with effective coverage, enabling users to efficiently remove debris from both flat and curved inner surfaces of the orthodontic appliance.

The pyramidal brush profile 110 is associated with an angle in a range of 45 to 120 degrees. In alternative embodiments, the angle may range from approximately 30 to 150 degrees, with specific configurations including angles of approximately 35 degrees, 40 degrees, 50 degrees, 60 degrees, 75 degrees, 90 degrees, 105 degrees, 125 degrees, 135 degrees, and 145 degrees. The angle selection may be optimized based on the specific geometry of orthodontic appliances being cleaned, with steeper angles (ranging from 30 to 60 degrees) being particularly suitable for deep cleaning of curved appliance surfaces, moderate angles (ranging from 60 to 90 degrees) providing balanced cleaning effectiveness for general applications, and wider angles (ranging from 90 to 150 degrees) being advantageous for accessing broad surface areas or providing gentle cleaning action. The pyramidal configuration may incorporate variable angles within the same brush profile, with different sections having angles selected from any value within the range of 30 to 150 degrees to optimize cleaning performance across diverse appliance geometries.

Figure 7:
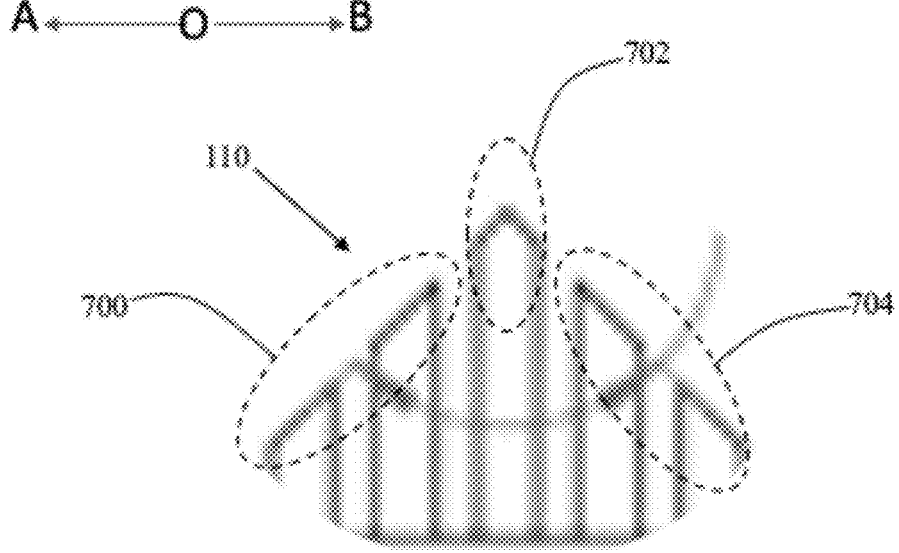
FIG. 7 shows a zoomed-in view of a pyramidal brush profile of the orthodontic tool of FIG. 3, in accordance with an embodiment of the present disclosure.

Referring now to FIG. 7, there is shown a zoomed-in view of the pyramidal brush profile 110 shown in FIG. 3, in accordance with an embodiment of the present disclosure. As shown, the pyramidal brush profile 110 comprises a first section 700 comprising bristles oriented at a downward slant toward a first side OA of the orthodontic tool 100. The bristles of the first section 700 are slanted at an angle within a range of 30 to 45 degrees relative to a vertical reference axis. This angled orientation allows the bristles to effectively reach and scrub surface contours of the orthodontic appliance from one side.

The bristles of the first section 700 are slanted at an angle within a range of 30 to 45 degrees relative to a vertical reference axis. In various embodiments, the bristle angles may range more broadly from approximately 15 to 75 degrees relative to the vertical reference axis, with specific angular configurations including approximately 18 degrees, 22 degrees, 25 degrees, 35 degrees, 40 degrees, 50 degrees, 55 degrees, 60 degrees, 65 degrees, and 70 degrees. The bristle orientation angle may be selected based on the intended cleaning application, with shallower angles (ranging from 15 to 35 degrees) providing aggressive cleaning action for stubborn deposits, moderate angles (ranging from 30 to 50 degrees) offering balanced cleaning effectiveness with user comfort, and steeper angles (ranging from 45 to 75 degrees) delivering gentle cleaning suitable for sensitive appliance materials. Different bristle sections within the same brush member may incorporate varying angles selected from the range of 15 to 75 degrees to optimize cleaning performance across different zones of the orthodontic appliance.

The pyramidal brush profile 110 further comprises a middle section 702 comprising bristles with split-tip orientations. Specifically, a first half of a tip of each bristle of the middle section 702 is oriented at a downward slant toward the first side OA, while a second half of the tip of each bristle is oriented at a downward slant toward a second side OB, which is opposite to the first side OA of the orthodontic tool 100. The bristles in the middle section 702 may be associated with slant angles ranging from 40 to 50 degrees, creating a central apex that maximizes surface contact on both sides of the brush.

The pyramidal brush profile 110 additionally comprises a third section 704 comprising bristles oriented at a downward slant toward the second side OB of the orthodontic tool 100. The slant angle of the bristles in the third section 704 may fall within a range of 45 to 60 degrees, allowing thorough cleaning coverage from the opposite side relative to the first section 700. This multi-angled brush layout ensures that the user can clean both flat and concave internal surfaces of the orthodontic appliance efficiently during routine maintenance.

The brush member 106 incorporates an angulated bristle arrangement specifically engineered to provide comprehensive cleaning access to both internal and external orthodontic appliance surfaces. The angulated design of the pyramidal brush profile 110 enables effective cleaning of the curved internal geometries of orthodontic aligners and retainers, with particular emphasis on reaching the central portions of the appliance where conventional cleaning approaches may be inadequate. The bristle configuration additionally accommodates interdental cleaning functionality, allowing users to clean teeth surfaces between meals prior to appliance reinsertion, which is particularly advantageous for patients who carry the orthodontic tool 100 in their appliance storage case for portable oral hygiene maintenance. The bristle arrangement within the first section 700, middle section 702, and third section 704 are optimized to provide effective cleaning action while maintaining compact dimensions suitable for integration with the overall tool architecture.

In another implementation, the brush member 106 may be removably attached to the orthodontic tool 100, enabling detachment and reattachment without causing damage to the orthodontic tool 100. This design allows the brush member 106 to be conveniently replaced when worn out, contaminated, or when a different brush type is desired based on specific cleaning tasks. The detachable configuration supports hygiene, tool efficiency, and adaptability to varied user requirements.

The orthodontic tool 100 may be designed to accommodate various cleaning and maintenance protocols including but not limited to rinse-and-dry procedures, ultrasonic cleaning compatibility, autoclave sterilization for clinical use, or specialized cleaning solutions for enhanced hygiene maintenance. The brush member 106 may incorporate self-cleaning features such as bristle 108 arrangements that facilitate debris removal, antimicrobial treatments that reduce bacterial accumulation, or replaceable bristle inserts that enable periodic renewal without tool replacement. Maintenance indicators such as wear patterns on the tapered tip 200, bristle 108 degradation markers, or pivot mechanism 400 performance metrics may be incorporated to guide users regarding optimal replacement intervals. The orthodontic tool 100 design may facilitate disassembly for thorough cleaning while maintaining reassembly simplicity to ensure consistent performance and user compliance with hygiene protocols.

The removable connection can be realized using coupling techniques such as snap-fit joints, threaded interfaces, or keyed slots with retention features. These mechanisms ensure a secure fit during operation while still allowing quick and simple removal for replacement or maintenance. This modularity enhances product durability, reduces overall replacement costs, and provides the user with flexibility in selecting or upgrading brush components according to their preferences or task demands.

Figure 8:
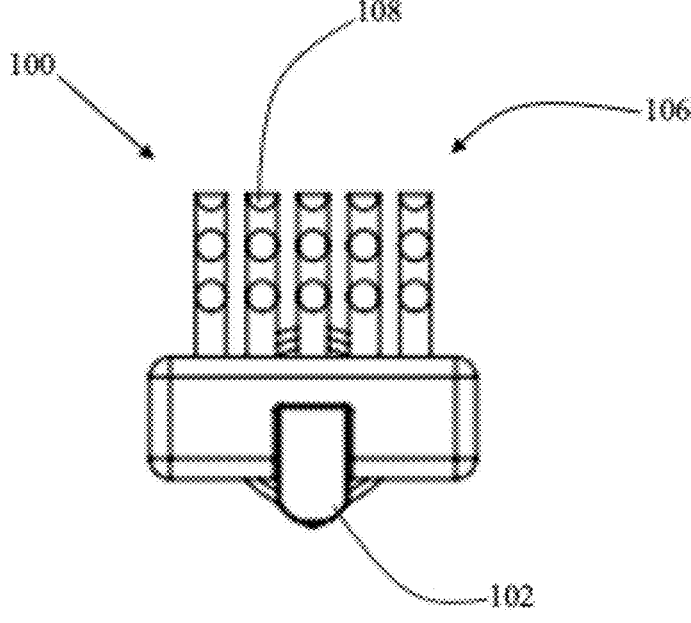
FIG. 8 shows a front view of the orthodontic tool of FIGS. 1-7, in accordance with an embodiment of the present disclosure.
Figure 9:
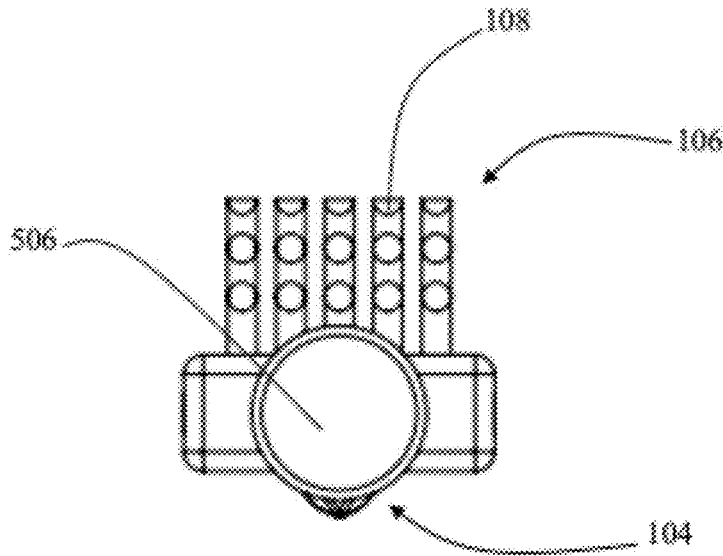
FIG. 9 shows a back view of the orthodontic tool of FIGS. 1-8, in accordance with an embodiment of the present disclosure.

Referring to FIG. 8, there is shown a side view of the orthodontic tool 100 of FIGS. 1-7, and referring to FIG. 9, there is shown a bottom view of the orthodontic tool 100 of FIGS. 1-8, in accordance with various embodiments of the present disclosure. The top and bottom views illustrate the compact and ergonomic design of the orthodontic tool 100, with each functional member, such as the hook member 102, the chewy member 104, and the brush member 106, integrated along the outer surfaces in a manner that preserves spatial efficiency. Such a configuration enables easy access to each function while maintaining a streamlined profile suitable for storage within standard orthodontic appliance cases, thereby enhancing portability and user convenience.

Figure 10:
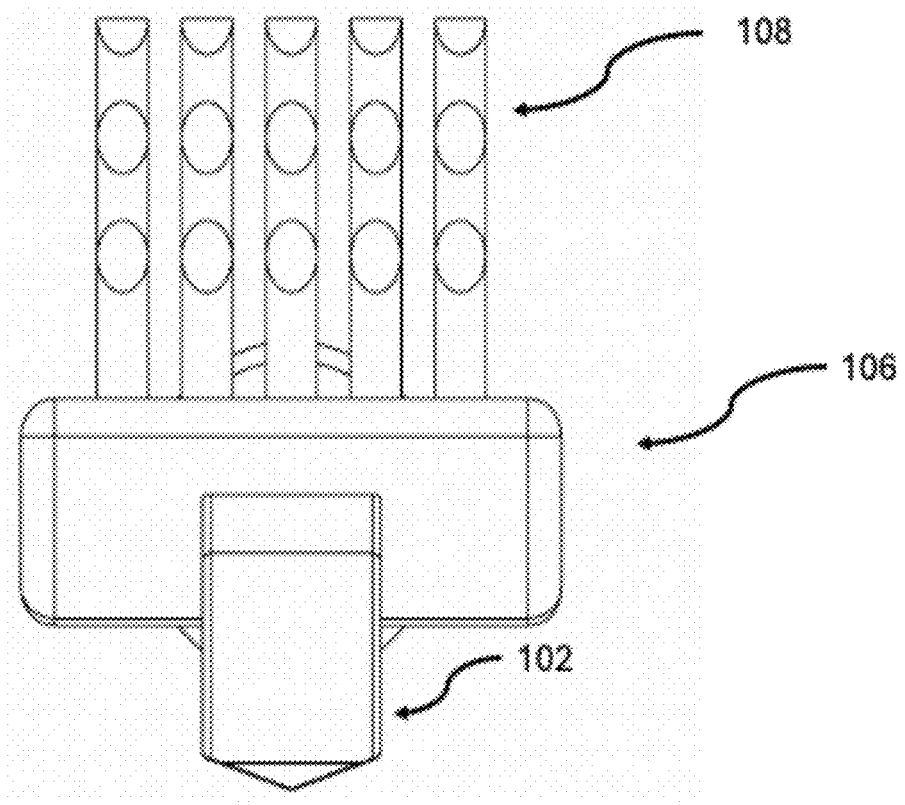
FIG. 10 FIG. 10 presents a detailed perspective view of the orthodontic tool (100) showcasing the integrated configuration of the primary functional components.

FIG. 10 presents a detailed perspective view of the orthodontic tool (100) showcasing the integrated configuration of the primary functional components. The hook member (102) is prominently displayed extending from one end of the orthodontic tool (100), demonstrating its tapered design and positioning for optimal appliance engagement. The brush member (106) is clearly visible positioned on the top surface of the orthodontic tool (100), featuring the plurality of bristles (108) arranged in the characteristic pyramidal brush profile that tapers toward the middle section. This view effectively illustrates the spatial relationship between the hook member (102) and brush member (106), showing how both components are permanently integrated within the single body structure of the orthodontic tool (100). The figure demonstrates the compact and ergonomic design that enables all functional components to coexist within the portable structure while maintaining easy access for their respective orthodontic appliance management functions.

Figure 11:
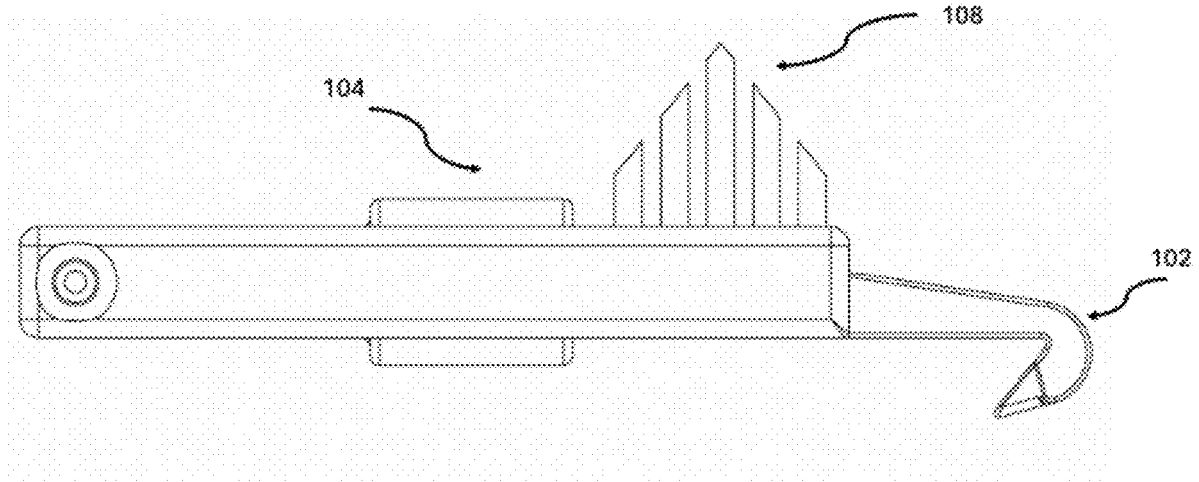
FIG. 11 provides a comprehensive view of the orthodontic tool with the chewy member in its non-deployed or stowed away position in the cavity.

FIG. 11 provides a comprehensive view of the orthodontic tool (100) with the chewy member (104) in its non-deployed or stowed away position in the cavity (500). The hook member (102) is shown at the opposite end, maintaining its characteristic tapered configuration for appliance removal functionality. The brush member (106) with its plurality of bristles (108) is positioned between the hook member (102) and chewy member (104), demonstrating the strategic placement that optimizes the tool's functionality. This figure particularly emphasizes the pivot mechanism configuration that allows the chewy member (104) to extend from its stowed position within the opening (500) to this active position for use during orthodontic appliance seating procedures. The spatial arrangement shown in this figure illustrates how the three primary functional components work together within the integrated design while maintaining the tool's portability and ease of use.

Figure 12:
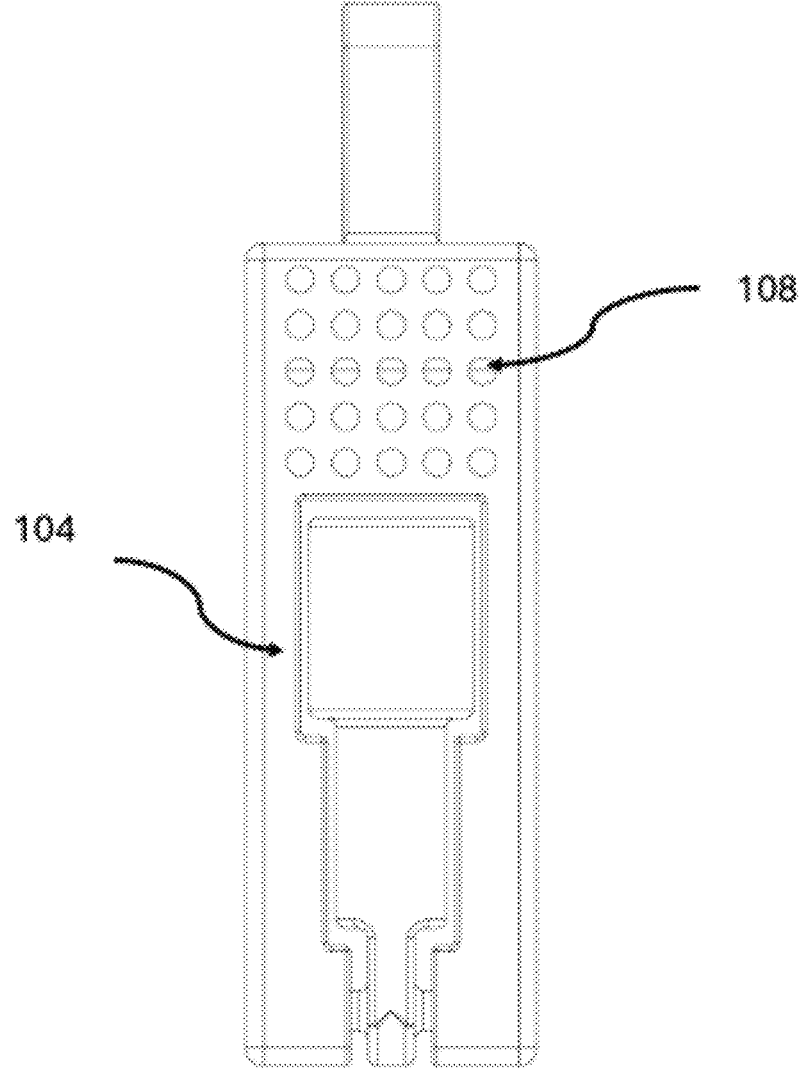
FIG. 12 provides a perspective view of the orthodontic tool configuration with particular emphasis on the chewy member.

FIG. 12 focuses on the orthodontic tool (100) configuration with particular emphasis on the chewy member (104) being shown in a specific positional relationship that highlights the tool's versatility and multi-functional capabilities.

The plurality of bristles (108) are clearly visible, demonstrating their pyramidal arrangement and the varying angular orientations that enable comprehensive cleaning of orthodontic appliance surfaces.

Figure 13:
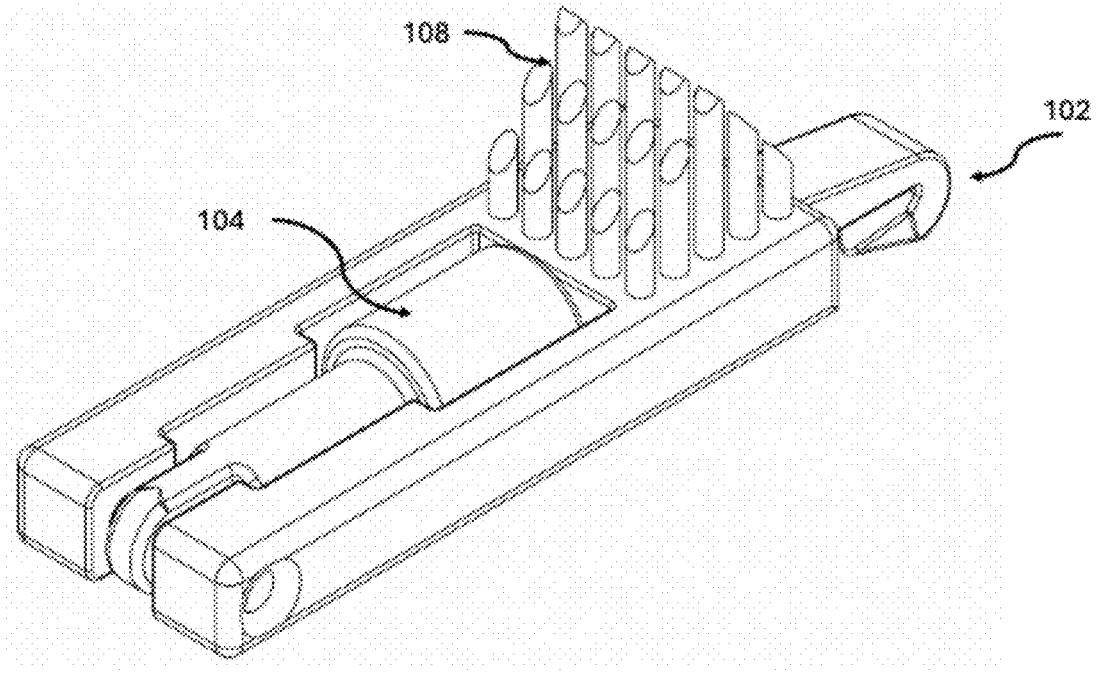
FIG. 13 provides a perspective view of the orthodontic tool with the chewy member and brush member clearly visible.

FIG. 13 presents the orthodontic tool (100) with the chewy member (104) and brush member (106) clearly visible, along with the hook member (102) positioned at the opposite end. The plurality of bristles (108) of the brush member (106) are prominently displayed, showing their structured arrangement and the pyramidal profile configuration. The chewy member (104) is shown in a position that demonstrates its relationship with the pivot mechanism and opening within the orthodontic tool (100) body. This figure effectively illustrates the stepped cylindrical profile of the chewy member (104), with its first and second cylindrical portions that provide the functional gripping surface for bite force distribution during orthodontic appliance seating procedures. The overall configuration shown in FIG. 13 emphasizes the integrated design approach where all three functional components—the hook member (102), chewy member (104), and brush member (106) with its plurality of bristles (108)—work together within the single portable structure to provide comprehensive orthodontic appliance management capabilities.

The orthodontic tool may further comprise additional functional members including but not limited to flossing elements, interdental cleaning devices, massage components, scraping tools, mirror elements, LED illumination, sonic vibration mechanisms, antimicrobial treatment surfaces, or any other components that facilitate orthodontic appliance management or oral hygiene maintenance.

The orthodontic tool 100 may incorporate enhanced ergonomic features to improve user experience and operational effectiveness. The body of the orthodontic tool 100 may include textured grip surfaces, finger indentations, or contoured profiles that facilitate secure handling during hook member 102 engagement, brush member 106 cleaning operations, or chewy member 104 deployment procedures. Visual indicators such as color coding, directional arrows, or tactile markers may be integrated into the orthodontic tool 100 surface to guide proper component orientation and usage techniques. The overall dimensions of the orthodontic tool 100 may be optimized based on anthropometric data to accommodate various hand sizes and dexterity levels, with particular consideration for pediatric users, elderly patients, or individuals with limited manual dexterity. The weight distribution within the orthodontic tool 100 may be balanced to prevent fatigue during extended use sessions while maintaining the structural integrity necessary for effective appliance manipulation and cleaning procedures.

It is to be appreciated that all the aforementioned implementation forms can be combined. The described functionalities and steps performed by various entities in the present disclosure are intended to indicate that the respective entities are adapted to or configured to perform these functionalities and steps. Additionally, features of the present disclosure are susceptible to being combined in various configurations without departing from the scope of the present disclosure as defined by the appended claims. The drawings and detailed description of the illustrative implementations, when construed in conjunction with the appended claims, make additional aspects, advantages, features, and objects of the present disclosure apparent.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The foregoing description and accompanying figures illustrate the principles, embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

It should be understood that the angular specifications disclosed herein represent preferred ranges that have been validated through testing and clinical evaluation. However, the invention is not limited to these specific ranges, and alternative angular configurations may be employed based on specific application requirements, patient preferences, manufacturing considerations, or orthodontic appliance variations. Angular measurements may vary by plus or minus 15 degrees from the stated ranges while still achieving the intended functional benefits. Additionally, the angular relationships may be adjusted to accommodate different appliance geometries, material properties, or user ergonomic requirements. The optimal angular configuration for any particular embodiment may be determined through routine experimentation and may fall within broader ranges that encompass the specifically disclosed values as sub-ranges thereof. It is further understood that manufacturing tolerances may result in angular variations of plus or minus 5 to 10 degrees from the specified ranges without departing from the scope of the invention. The angular specifications encompass both the nominal design angles and the practical manufacturing variations that may occur during production while still achieving the intended functional performance.

The orthodontic tool 100 may be manufactured through various production methods including but not limited to injection molding, 3D printing, CNC machining, or hybrid manufacturing techniques that combine multiple processes to optimize material properties and component integration. The hook member 102 and brush member 106 may be permanently integrated into the orthodontic tool 100 body through techniques including co-molding, ultrasonic welding, mechanical interlocking, adhesive bonding, or integral formation during the primary manufacturing process. The opening 500 may be formed through precision drilling, laser cutting, electrical discharge machining, or molded-in-place techniques that ensure accurate dimensional tolerances for proper pivot mechanism 400 function. Quality control parameters may include dimensional verification of the tapered tip 200 angle, bristle 108 alignment within the pyramidal brush profile 110, pivot mechanism 400 rotational resistance, and overall tool 100 structural integrity under simulated use conditions. Manufacturing scalability considerations include tooling design for high-volume production, material sourcing for consistent properties across production runs, and assembly line optimization for efficient component integration and quality assurance protocols.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the disclosure.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The invention claimed is:

1. An orthodontic tool comprising:
a hook member configured to assist in removal of an orthodontic appliance from a dental arch of a user, the hook member comprising a tapered tip with lateral projections extending outwardly from opposite sides of a body of the hook member;

a chewy member configured to facilitate seating of the orthodontic appliance onto the dental arch of the user, the chewy member comprising a pivot portion, a first cylindrical portion having a first diameter, and a second cylindrical portion having a second diameter greater than the first diameter, the first cylindrical portion and the second cylindrical portion forming a stepped cylindrical profile of the chewy member;

a brush member configured to clean internal surfaces of the orthodontic appliance, the brush member comprising a pyramidal brush profile tapering toward a middle of the brush member and having bristles arranged in three distinct sections with varying angular orientations;

an opening formed within a body of the orthodontic tool and configured to pivotally receive only the chewy member, wherein the opening extends through an entire width of the orthodontic tool from a top surface to a bottom surface;

a pivot mechanism configured to enable rotational movement of the chewy member between a stowed position within the opening and an active position extending outwardly from the orthodontic tool; and wherein the hook member and brush member are permanently integrated within the body of the orthodontic tool and cannot be individually separated therefrom, and wherein only the chewy member is removable and replaceable, and wherein the hook member, the chewy member, and the brush member are consolidated into a single portable structure sized to be stored within a standard orthodontic appliance case.

2. The orthodontic tool of claim 1, wherein the stepped cylindrical profile of the chewy member provides a functional gripping surface for bite force distribution, with the first cylindrical portion serving as a transitional section and the second cylindrical portion increasing surface area for effective pressure application across the orthodontic appliance surface to facilitate proper seating of the orthodontic appliance onto the dental arch.

3. The orthodontic tool of claim 1, wherein the opening is shaped to include a wider region and a narrower region that mirror and receive the first cylindrical portion and the second cylindrical portion respectively, such that when the chewy member pivots into the opening for stowage, the first cylindrical portion is received in the narrower region of the opening and the second cylindrical portion is received in the wider region of the opening.

4. The orthodontic tool of claim 1, wherein the tapered tip is associated with a taper angle within a range of 60 to 120 degrees.

5. The orthodontic tool of claim 4, wherein the tapered tip is disposed at an angle within a range of 30 to 80 degrees with respect to the body of the hook member.

6. The orthodontic tool of claim 1, wherein the lateral projections are oriented at increased angles relative to a hook shaft axis to provide enhanced mechanical advantage for appliance engagement in patients experiencing gingival inflammation or tissue swelling.

7. The orthodontic tool of claim 1, wherein the pyramidal brush profile is associated with an angle in a range of 45 to 120 degrees.

8. The orthodontic tool of claim 7, wherein the three distinct sections comprise:

a first section comprising bristles oriented at a downward slant toward a first side of the orthodontic tool at an angle within a range of 30 to 45 degrees relative to a vertical reference axis;

a middle section comprising bristles with split-tip orientations, wherein a first half of a tip of each bristle is oriented toward the first side and a second half of the tip of each bristle is oriented toward a second side opposite to the first side; and a third section comprising bristles oriented at a downward slant toward the second side of the orthodontic tool.

9. The orthodontic tool of claim 1, wherein the chewy member is fabricated from thermoplastic polyurethane (TPU) in production embodiments and medical-grade silicone with Shore A 90 hardness in prototype embodiments.

10. The orthodontic tool of claim 1, wherein the body of the orthodontic tool is fabricated from polylactic acid (PLA) material.

11. The orthodontic tool of claim 1, wherein the chewy member maintains uniform material properties throughout the first cylindrical portion and the second cylindrical portion to eliminate hardness differentials.

12. The orthodontic tool of claim 1, further comprising a locking mechanism configured to retain the chewy member in a fixed position during use, wherein the locking mechanism comprises at least one of detent mechanisms, friction fits, snap-fit features, or spring-loaded catches.

13. The orthodontic tool of claim 1, wherein the hook member is configured to serve as an engagement tool for orthodontic elastic bands, enabling placement of elastic bands onto attachment points located on posterior teeth.

14. The orthodontic tool of claim 1, wherein the pivot mechanism includes detent positions that provide discrete angular positioning for the chewy member during deployment and stowage operations.

15. The orthodontic tool of claim 1, wherein the opening incorporates retention grooves or friction surfaces that interact with the pivot portion to maintain desired positioning of the chewy member during bite forces applied to the first cylindrical portion and second cylindrical portion.

* * * * *